Patented Mar. 26, 1935

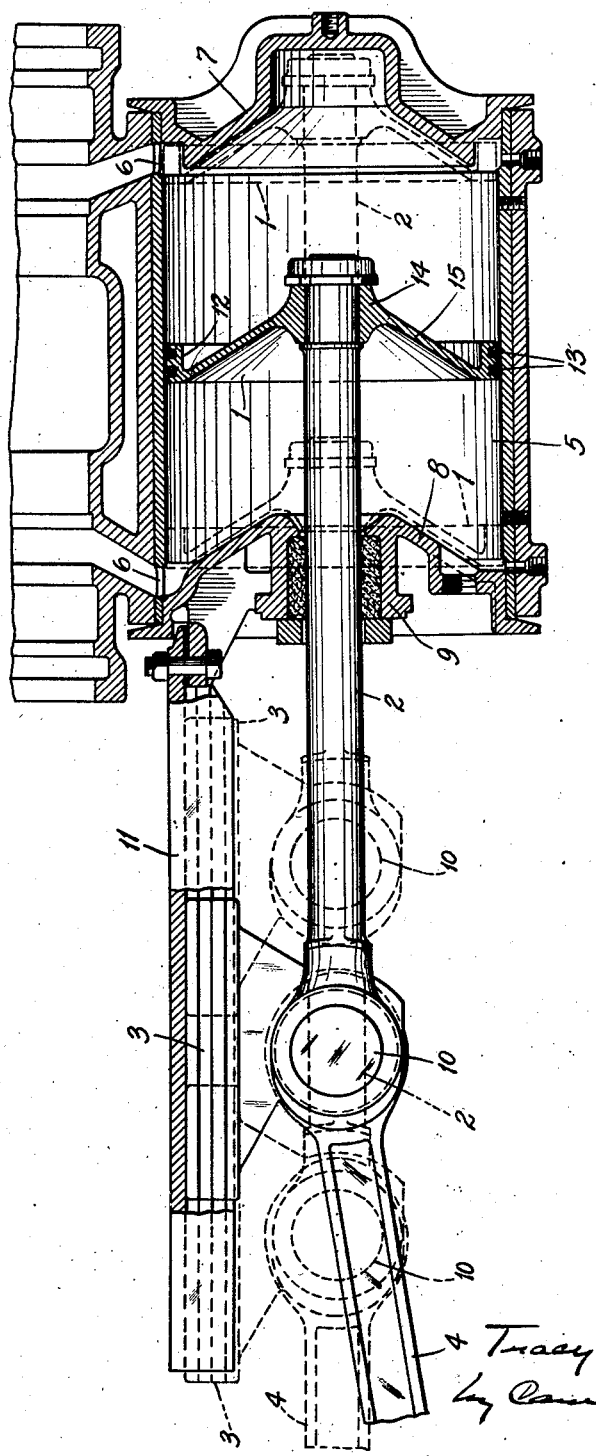

1,995,836

UNITED STATES PATENT OFFICE 1,995,836

LOCOMOTIVE PISTON

Tracy V. Buckwalter, Canton, Ohio, assignor to The Timken Roller Bearing Company, Canton, Ohio, a corporation of Ohio Application May 22, 1933, Serial No. 672,215

1 Claim. (Cl. 309—4)

My invention relates to locomotive driving gears.

Water is liable to accumulate in cylinders of locomotives due partly to being entrained by the steam but more especially due to condensation of the steam in cold weather when the locomotive is standing still. A certain amount of water in the clearance space at the end of the cylinder can be evaporated when the cylinder becomes hot. On the other hand, if the accumulation of water is excessive, the cylinder head is liable to be blown out. The object of the present invention is to overcome this danger. The invention consists principally in making the piston of a design and material that will enable it to do its work efficiently and still permit it to distend resiliently under excessive resistance of the water and thereby increase the normal clearance space in the cylinder. It also consists in using an alloy steel for making the piston rod and main rod and making them sufficiently light enough to spring or stretch slightly under the resistance of water accumulated in the clearance space and thereby shorten the stroke of the piston with the effect of substantially increasing such clearance space. It also consists in the combination of parts hereinafter described and claimed.

The accompanying drawing is a part side elevation, part vertical sectional view through the cylinder and piston of a locomotive engine, the piston being shown in full lines in middle portion and in dotted lines in its two endmost positions.

In the accompanying drawing, my invention is shown in connection with a driving gear of the kind adapted for transmitting the reciprocating motion imparted to the piston 1, piston rod 2, cross-head 3 and main rod 4 to the rotating driving wheel (not shown) of a locomotive. The piston 1 is reciprocated in its cylinder 5 by the expansive force of steam admitted to the latter through the usual ports 6 located adjacent to the opposite ends of said cylinder. The ends of the cylinder 5 are closed by the usual front and back cylinder heads 7 and 8, respectively, the back cylinder head 8 having a central opening extending therethrough in which is mounted the usual stuffing box 9 in which the piston rod 2 works. The adjacent ends of the piston rod 2 and main rod are pivotally secured by the usual wrist pin 10 to the cross-head 3, which is suspended from the usual guide 11 for sliding movement parallel to the axis of the piston rod.

With locomotive engines that are now in use, it is the practice to make the pistons of cast iron or cast steel and of such design and weight as to be practically rigid and inflexible. Likewise, it has been the practice to make the main rod and the piston rod of steel and of sufficient weight to remain substantially rigid and inflexible in service. Under these conditions, the stroke of the piston is constant and the minimum volume of the clearance space between the face of the piston and the end of the cylinder is constant.

According to the present invention, the piston 1 is made of a high grade alloy steel that will maintain the rigidity and shape under normal working pressures but which will flex or distend resiliently when the pressure becomes abnormally high, as when the clearance space is full of water. This piston comprises a cylindrical rim portion 12 with grooves therein for the packing rings 13 which fit the wall of the cylinder. It also comprises a central hub 14 through which extends the end of the piston or driving rod 2 mounted and secured therein in the usual way. The portion of the piston between and integral with the rim portion 12 and the hub portion 14 thereof is a relatively thin and somewhat conical web 15, which is rigid under normal working pressures but is resilient enough to distend after the manner of a diaphragm under excessive pressure.

The material, of which the piston is made, is alloy steel, preferably alloy steel conforming to the following formula:

| | Per cent |
|---|---|
| Carbon | .35– .45 |
| Chromium | .60– .80 |
| Nickel | 1.50–2.00 |
| Molybdenum | .20– .30 |
| Manganese | .60– .80 |

The properties of an alloy steel of this formula, after suitable heat treatment, are indicated by the following data:

| | |
|---|---|
| Yield point | 120,000 lbs. |
| Elongation | 20% |
| Reduction | 55% |
| Izod | 70 |
| Brinell | 290 |

The special merits of this alloy steel which fit it for this particular use are first, its stiffness or ability to resist distortion under normal working pressures, second, its flexibility or ability to resume its initial shape when distorted therefrom by excessive or abnormal pressure, and third, the relative lightness of a piston made therefrom in comparison with the weight of the usual piston.

Instead of making the piston rod 2 and the main rod 4 in accordance with present day practice, I prefer to make them of the alloy steel above mentioned and of smaller cross-sectional area than heretofore used. The properties of a piston rod made of such alloy steel, after suitable heat treatment, in comparison with the properties of a conventional piston rod made of plain carbon steel are indicated by the following data:

|  | Plain carbon steel | Alloy steel |
|---|---|---|
| Yield point | 49,000 lbs. | 135,000 lbs. |
| Elongation | 32% | 18% |
| Reduction | 65.9% | 55% |
| Izod (untreated) | 4-7 | 50 |
| Brinell | 150 | 311-341 |

By using such high grade alloy steel and reducing the cross-sectional area of said rods, they acquire a capacity for flexing and stretching under excessive stress, such as arises from the resistance of an excessive quantity of water in the clearance space. Such flexing or stretching shortens slightly the stroke of the piston and thereby increases the clearance space between the face of the piston and the head of the cylinder.

Under normal conditions, the operation of the engine is the same as heretofore. If, however, water accumulates in the cylinder in sufficient quantity to oppose abnormal or excessive resistance to the piston, the effect of such resistance is first, to distend the web portion 15 of the piston and thereby increase the minimum clearance space in the cylinder, and second, to flex or stretch the driving rod 2 or main rod 4 or both sufficiently to appreciably shorten the stroke of the piston and thereby also increase the minimum clearance space. In this way, the effects of the resistance of excessive water in the cylinder are dissipated in the piston and in the piston rod and in the main rod, in consequence of which the pressure on the cylinder head cannot reach the excessive height which would otherwise be likely to blow out said cylinder head.

What I claim is:

A piston comprising a cylindrical rim portion, a central hub portion and an intermediate web portion, said piston being made of alloy steel capable of yielding resiliently to abnormal pressure and said web being thin enough to distend resiliently under abnormal pressure.

TRACY V. BUCKWALTER.